United States Patent
Ouyang et al.

(10) Patent No.: US 10,938,509 B2
(45) Date of Patent: Mar. 2, 2021

(54) COMMUNICATION METHOD, CABLE MODEM TERMINAL SYSTEM, AND CABLE MODEM

(71) Applicant: HUAWEI TECHNOLOGIES CO., LTD., Guangdong (CN)

(72) Inventors: Tao Ouyang, Shenzhen (CN); Xiaolong Zhang, Shenzhen (CN); Fan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 16/229,769

(22) Filed: Dec. 21, 2018

(65) Prior Publication Data
US 2019/0123856 A1    Apr. 25, 2019

Related U.S. Application Data (63) Continuation of application No. PCT/CN2016/092116, filed on Jul. 28, 2016.

(51) Int. Cl.
*H04L 1/00* (2006.01)
*H04B 3/32* (2006.01)
(Continued)

(52) U.S. Cl.
CPC .......... *H04L 1/0027* (2013.01); *H04B 3/23* (2013.01); *H04B 3/32* (2013.01); *H04B 3/487* (2015.01);
(Continued)

(58) Field of Classification Search
CPC ........ H04B 17/345; H04B 3/487; H04B 3/23; H04B 3/32; H04B 10/079; H04L 1/0027;
(Continued)

(56) References Cited

U.S. PATENT DOCUMENTS

| | | | | |
|---|---|---|---|---|
| 6,650,624 B1* | 11/2003 | Quigley | ............... | H04J 3/1694 370/252 |
| 2002/0094044 A1* | 7/2002 | Kolze | ............... | H04L 25/03006 375/346 |

(Continued)

FOREIGN PATENT DOCUMENTS

| CN | 104838610 A | 8/2015 |
|---|---|---|
| CN | 105284066 A | 1/2016 |

(Continued)

OTHER PUBLICATIONS

Office Action issued in Chinese Application No. 201680082081.1 dated Feb. 3, 2020, 9 pages (with English translation).

(Continued)

*Primary Examiner* — Jenee Holland
(74) *Attorney, Agent, or Firm* — Fish & Richardson P.C.

(57) ABSTRACT

The communication method includes: sending, by a CMTS (cable modem terminals stem), a reference signal within a first time period by using a valid subcarrier in a first spectrum, where the first time period is a time period within which none of CMs (cable modems) connected to the CMTS sends a signal in the first spectrum; performing, by the CMTS based on an interfering signal received by the CMTS within the first time period, channel interference estimation on a channel that is used during signal reception of the CMTS and that occupies the first spectrum, where the interfering signal is a signal obtained after the reference signal passes through the channel; and canceling, by the CMTS based on a result of the channel interference estimation, interference from a first signal received by the CMTS to a second signal received by the CMTS.

16 Claims, 5 Drawing Sheets

(51) Int. Cl.
  *H04B 10/079* (2013.01)
  *H04L 5/00* (2006.01)
  *H04B 3/23* (2006.01)
  *H04L 5/14* (2006.01)
  *H04B 17/345* (2015.01)
  *H04B 3/487* (2015.01)
  *H04L 1/20* (2006.01)
  *H04L 25/02* (2006.01)
  *H04B 1/56* (2006.01)

(52) U.S. Cl.
  CPC ......... *H04B 10/079* (2013.01); *H04B 17/345* (2015.01); *H04L 1/20* (2013.01); *H04L 5/0007* (2013.01); *H04L 5/0048* (2013.01); *H04L 5/1438* (2013.01); *H04L 5/1461* (2013.01); *H04L 25/0238* (2013.01); *H04B 1/56* (2013.01)

(58) Field of Classification Search
  CPC . H04L 1/20; H04L 1/56; H04L 5/0007; H04L 5/0048; H04L 5/1438; H04L 5/1461; H04L 25/0238
  See application file for complete search history.

(56) References Cited

U.S. PATENT DOCUMENTS

| | | | |
|---|---|---|---|
| 2002/0126778 A1* | 9/2002 | Ojard | H04B 1/1036 375/346 |
| 2003/0202567 A1* | 10/2003 | Yousef | H04L 1/0009 375/148 |
| 2004/0068748 A1* | 4/2004 | Currivan | H04N 7/17309 725/111 |
| 2014/0022943 A1 | 1/2014 | Ling et al. | |
| 2014/0198688 A1 | 7/2014 | Li et al. | |
| 2014/0294052 A1* | 10/2014 | Currivan | H04L 27/2613 375/224 |
| 2015/0280887 A1 | 10/2015 | Ko et al. | |
| 2016/0036490 A1 | 2/2016 | Wu et al. | |
| 2016/0072578 A1 | 3/2016 | Jin et al. | |
| 2016/0127114 A1 | 5/2016 | Kim et al. | |
| 2016/0285502 A1 | 9/2016 | Liu | |
| 2017/0141937 A1 | 5/2017 | Zhou et al. | |
| 2017/0222842 A1 | 8/2017 | Si et al. | |

FOREIGN PATENT DOCUMENTS

| | | |
|---|---|---|
| CN | 105306144 A | 2/2016 |
| CN | 105450559 A | 3/2016 |
| WO | 2015081514 A1 | 6/2015 |
| WO | 2016065554 A1 | 5/2016 |

OTHER PUBLICATIONS

Hamzeh, "Full Duplex DOCSIS Technology over HFC Networks", CableLabs, Inc., 2016 Spring Technical Proceedings, Mar. 21, 2016, XP055583539, 5 pages.

Hamzeh [online], "Full Duplex DOCSIS 3.1 Technology: Raising the Ante with Symmetric Gigabit Service," Informed Blog by CableLabs, Feb. 16, 2016, [retrieved on Apr. 25, 2019], XP055583521, retrieved from: URL<https://www.cablelabs.com/full-duplex-docsis-3-1-technology-raising-the-ante-with-symmetric-gigabit-service>, 17 pages.

Cable Television Laboratories,"Data-Over-Cable Service Interface Specifications DOCSIS 3.1," Physical Layer Specification, CM-SP-PHYv3.1-O09-160602, Jun. 2, 2016, XP055348939, 245 pages.

Partial Supplementary European Search Report issued in European Application No. 16910096.3 dated May 6, 2019, 19 pages.

Office Action issued in Chinese Application No. 201680082081.1, dated Jul. 1, 2019, 16 pages (With English translation).

Data-Over-Cable Service Interface Specifications, DOCSIS3.1, Physical Layer Specification, CM-SP-PHYv3.1-I07-150910. Sep. 2015. total 244 pages.

International Search Report and Written Opinion issued in International Application No. PCT/CN2016/092116 dated Apr. 25, 2017, 17 pages.

* cited by examiner

FIG. 1

```
┌─────────────────────────────────────────────────────────────┐
│ A CMTS sends a reference signal within a first time period  │
│ by using a valid subcarrier in a first spectrum, where the  │~ S210
│ first time period is a time period within which none of CMs │
│ connected to the CMTS sends a signal                        │
└─────────────────────────────────────────────────────────────┘
                              │
                              ▼
┌─────────────────────────────────────────────────────────────┐
│ The CMTS performs, based on an interfering signal received  │
│ by the CMTS within the first time period, channel           │
│ interference estimation on a channel that is used during    │~ S220
│ signal reception of the CMTS and that occupies the first    │
│ spectrum, where the interfering signal is a signal obtained │
│ after the reference signal sent by the CMTS passes through  │
│ the channel                                                 │
└─────────────────────────────────────────────────────────────┘
                              │
                              ▼
┌─────────────────────────────────────────────────────────────┐
│ The CMTS cancels, based on a result of the channel          │
│ interference estimation, interference from a first signal   │
│ received by the CMTS to a second signal received by the     │
│ CMTS, where the first signal is a signal sent by the CMTS   │~ S230
│ by using a subcarrier in the first spectrum, and the second │
│ signal is a signal sent by a first CM in all the CMs by     │
│ using a subcarrier in the first spectrum                    │
└─────────────────────────────────────────────────────────────┘
```

COMMUNICATION METHOD, CABLE MODEM TERMINAL SYSTEM, AND CABLE MODEM

CROSS-REFERENCE TO RELATED APPLICATIONS

This application is a continuation of International Application No. PCT/CN2016/092116, filed on Jul. 28, 2016, the disclosure of which is hereby incorporated by reference in its entirety.

TECHNICAL FIELD

The present invention relates to the communications field, and in particular, to a communication method, a cable modem terminal system (CMTS), and a cable modem (CM).

BACKGROUND

In the communications field, time division duplex (TDD), frequency division duplex (FDD) and co-time co-frequency full duplex (CCFD) are mainly included.

In a current CCFD solution, CCFD is implemented only on a CMTS side, and uplink and downlink FDD is still retained on a CM side. The CMTS side needs to perform self-interference cancellation, to cancel self-interference from a downlink transmitted signal to an uplink received signal.

A basic principle of self-interference cancellation is using a transmitted signal as an input signal, generating an output signal by reconstructing an interference signal, and then deducting the output signal from received signals, thereby achieving a cancellation objective.

In a CCFD solution in the cable field, in a possible implementation, a CMTS performs self-interference cancellation through blind channel estimation; in another possible implementation, a CMTS trains an interference channel by using random data, to reconstruct an interfering signal, thereby achieving a cancellation objective. However, the methods for performing self-interference cancellation through blind channel estimation and by using random data are both relatively complex.

SUMMARY

The present invention provides a communication method, a CMTS, and a CM, to reduce self-interference cancellation complexity of a CMTS during CCFD.

According to a first aspect, the present invention provides a communication method, including: sending, by a CMTS, a reference signal within a first time period by using a valid subcarrier in a first spectrum, where the first time period is a time period within which none of CMs connected to the CMTS sends a signal in the first spectrum; performing, by the CMTS based on an interfering signal received by the CMTS within the first time period, channel interference estimation on a channel that is used during signal reception of the CMTS and that occupies the first spectrum, where the interfering signal is a signal obtained after the reference signal sent by the CMTS passes through the channel; and canceling, by the CMTS based on a result of the channel interference estimation, interference from a first signal of the CMTS to a second signal received by the CMTS, where the first signal is a signal sent by the CMTS by using a subcarrier in the first spectrum, and the second signal is a signal sent by a first CM in all the CMs by using a subcarrier in the first spectrum.

In this embodiment of the present invention, because none of CMs sends a signal in the first spectrum when the CMTS sends the reference signal in the first spectrum, the CMTS receives only the reference signal that is sent by the CMTS and that passes through a self-interference path. In addition, because the reference signal is a known reference sequence, the CMTS may relatively easily perform, based on the received reference signal, channel interference estimation on the channel corresponding to the first spectrum, to obtain a channel response parameter of the self-interference path through training. Then the CMTS cancels, by using a result of the channel interference estimation, interference from a downlink signal subsequently sent by the CMTS to an uplink signal sent by a CM, thereby reducing self-interference cancellation complexity.

In a possible implementation, the communication method further includes: performing, by the CMTS, time domain interleaving with a depth of M on N continuous unused subcarrier block symbols, where each of the N continuous unused subcarrier block symbols includes an NCP and a FEC codeword, M and N are integers greater than 0, and N>M−1; and generating, by the CMTS, the reference signal, where a reference sequence corresponding to the reference signal is carried in N+1−M interleaved symbols.

In this embodiment of the present invention, the CMTS generates, through time domain interleaving, a reference signal including an NCP and a FEC codeword structure symbol, so that the communication method in this embodiment of the present invention is applicable to conventional DOCSIS 3.1.

In a possible implementation, the communication method further includes: sending, by the CMTS, a ranging message to the first CM, to instruct the first CM to perform time advance TA adjustment, so that the first CM sends the second signal after performing the TA adjustment.

In this embodiment of the present invention, the CMTS may instruct a CM to perform TA adjustment, so that a symbol of a signal sent by the CM and that of a signal sent by the CMTS can be aligned, and it can be ensured that symbols of a received signal and an interfering signal of the CMTS are synchronized.

In a possible implementation, the communication method further includes: sending, by the CMTS, a reference signal within a second time period by using a valid subcarrier in a second spectrum, where the second time period is a time period within which none of the CMs sends a signal in the second spectrum; and sending, by the CMTS, a reference signal within a third time period by using a valid subcarrier in the second spectrum, where the third time period is a time period within which a second CM in all the CMs sends a reference signal by using a valid subcarrier in the second spectrum while none of other CMs sends a signal in the second spectrum, so that a third CM in the other CMs determines, based on the reference signals received by the third CM within the second time period and the third time period, information about a channel that is from the second CM to the third CM and that occupies the second spectrum.

In the communication method in this embodiment of the present invention, a CM may measure information about a channel that is from another CM to the CM and that corresponds to a spectrum, so that an operation such as CM grouping or fault diagnosis can be performed based on the channel information.

In a possible implementation, the communication method further includes: receiving, by the CMTS, the information about the channel sent by the third CM.

In this embodiment of the present invention, after the CMTS receives the information about the channel sent by the CM, the CMTS may perform an operation such as CM grouping or fault diagnosis.

In a possible implementation, the communication method further includes: sending, by the CMTS, indication information used to indicate that the CMTS is to send a reference signal, information about a quantity of subcarrier block symbols included in the to-be-sent reference signal, and information about locations of the subcarrier block symbols included in the to-be-sent reference signal.

In this embodiment of the present invention, the CMTS may send, to a CM, information about a reference signal sent next time, so that the CM can accurately obtain the reference signal in time based on the information about the reference signal.

According to a second aspect, the present invention provides a communication method, including: receiving, by a first CM within a first time period, a reference signal sent by a CMTS by using a valid subcarrier in a first spectrum, where the first time period is a time period within which none of CMs connected to the CMTS sends a signal in the first spectrum, and the first CM is a CM in all the CMs; receiving, by the first CM within a second time period, a reference signal sent by a second CM by using a valid subcarrier in the first spectrum and a reference signal sent by the CMTS by using a valid subcarrier in the first spectrum, where the second CM is a CM in all the CMs, and the second time period is a time period within which none of other CMs, different from the second CM, in all the CMs sends a signal in the first spectrum; and determining, by the first CM based on the reference signals received within the first time period and the second time period, information about a channel that is from the second CM to the first CM and that occupies the first spectrum.

In the communication method in this embodiment of the present invention, a CM may measure information about a channel that is from another CM to the CM and that corresponds to a spectrum, so that an operation such as CM grouping or fault diagnosis can be performed based on the channel information.

In a possible implementation, the communication method further includes: sending, by the first CM, the information about the channel to the CMTS.

In this embodiment of the present invention, the CM sends the information about the channel to the CMTS, so that the CMTS performs an operation such as CM grouping or fault diagnosis.

According to a third aspect, the present invention provides a communication method, including: generating, by a first CM, a first reference signal; and sending, by the first CM, the first reference signal within a first time period by using a valid subcarrier in a first spectrum, where the first time period is a time period within which a CMTS connected to the first CM sends a reference signal by using a valid subcarrier in the first spectrum while none of other CMs, different from the first CM, in all CMs connected to the CMTS sends a signal in the first spectrum.

In the communication method in this embodiment of the present invention, a CM may measure information about a channel that is from another CM to the CM and that corresponds to a spectrum, so that an operation such as CM grouping or fault diagnosis can be performed based on the channel information.

In a possible implementation, the generating, by a first CM, a first reference signal includes: performing, by the first CM, time domain interleaving with a depth of M on N continuous unused subcarrier block symbols, where each of the N continuous unused subcarrier block symbols includes an NCP and a FEC codeword, M and N are integers greater than 0, and N>M−1; and generating, by the first CM, the first reference signal, where a reference sequence corresponding to the first reference signal is carried in N+1−M interleaved symbols.

In this embodiment of the present invention, the CM generates, through time domain interleaving, a reference signal including an NCP and a FEC codeword structure symbol, so that the communication method in this embodiment of the present invention is applicable to conventional DOCSIS 3.1.

According to a fourth aspect, the present invention provides a CMTS, where the CMTS includes a module configured to perform the communication method in the first aspect.

According to a fifth aspect, the present invention provides a CM, where the CM includes a module configured to perform the communication method in the second aspect.

According to a sixth aspect, the present invention provides a CM, where the CM includes a module configured to perform the communication method in the third aspect.

According to a seventh aspect, the present invention provides a CMTS, including a receiver, a transmitter, a processor, and a memory, where the memory is configured to store code, the processor is configured to execute the code in the memory, and the receiver and the transmitter are configured to communicate with another device. When the code is executed, the processor invokes the receiver and the transmitter to implement the method in the first aspect.

According to an eighth aspect, the present invention provides a CM, including a receiver, a transmitter, a processor, and a memory, where the memory is configured to store code, the processor is configured to execute the code in the memory, and the receiver and the transmitter are configured to communicate with another device. When the code is executed, the processor invokes the receiver and the transmitter to implement the method in the second aspect.

According to a ninth aspect, the present invention provides a CM, including a receiver, a transmitter, a processor, and a memory, where the memory is configured to store code, the processor is configured to execute the code in the memory, and the receiver and the transmitter are configured to communicate with another device. When the code is executed, the processor invokes the receiver and the transmitter to implement the method in the third aspect.

According to a tenth aspect, the present invention provides a computer readable medium, where the computer readable medium stores program code to be executed by a CMTS, and the program code includes an instruction used to perform the method in the first aspect.

According to an eleventh aspect, the present invention provides a computer readable medium, where the computer readable medium stores program code to be executed by a CM, and the program code includes an instruction used to perform the method in the second aspect.

According to a twelfth aspect, the present invention provides a computer readable medium, where the computer readable medium stores program code to be executed by a CM, and the program code includes an instruction used to perform the method in the third aspect.

According to a thirteenth aspect, the present invention provides a cable communications system, including the CMTS in the fourth aspect and the CM in the fifth aspect.

According to a fourteenth aspect, the present invention provides a cable communications system, including the CMTS in the seventh aspect and the CM in the eighth aspect.

According to a fifteenth aspect, the present invention provides a cable communications system, including the computer readable medium in the tenth aspect and the computer readable medium in the eleventh aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For ease of understanding, an example diagram of a system architecture of a cable network that can implement a communication method in an embodiment of the present invention is overall described first. It should be understood that the embodiments of the present invention are not limited to the system architecture shown in FIG. 1. In addition, an apparatus in FIG. 1 may be hardware, or may be functionally divided software, or a combination thereof.

Figure 1:
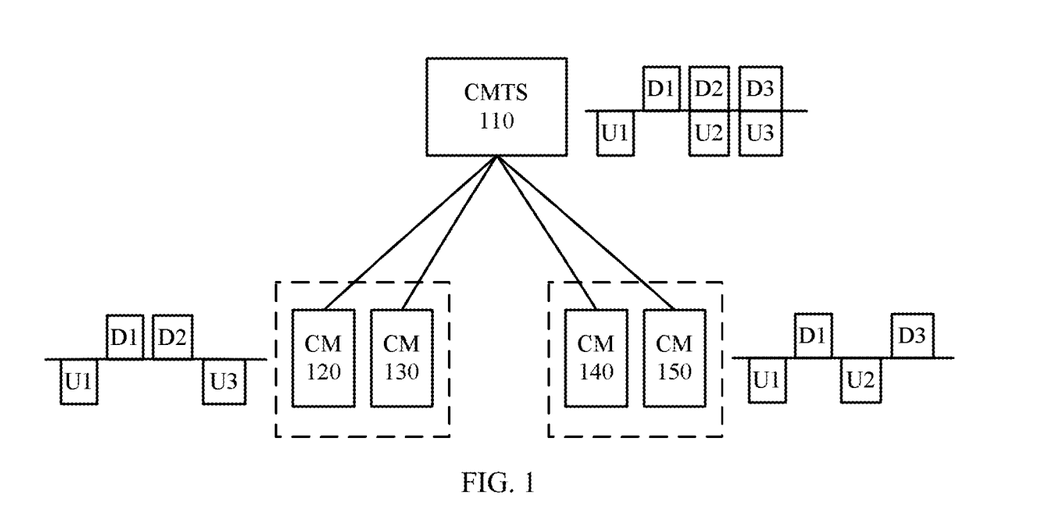
FIG. 1 is an example diagram of an application scenario of a communication method according to an embodiment of the present invention.

A system shown in FIG. 1 includes a CMTS 110, a CM 120, a CM 130, a CM 140, and a CM 150. It should be noted that a quantity of CMTSs and a quantity of CMs in FIG. 1 should not be construed as limitations to the present invention. The CMTS 110, the CM 120, the CM 130, the CM 140, and the CM 150 may conform to conventional Data Over Cable Service Interface Specifications (DOCSIS) 3.1.

The CMTS is a device that manages and controls the CM. Configuration of the CMTS may be completed by using a console interface or an Ethernet interface. Configuration content of the CMTS mainly includes a downlink frequency, a downlink modulation method, a downlink level, and the like. The downlink frequency may be arbitrarily set within a specified frequency range. However, in order not to interfere with a signal of another channel, a specified frequency should be selected with reference to a cable television channel division table. Channel transmission quality should be considered during selection of the modulation method. In addition, Internet Protocol (IP) addresses of Dynamic Host Configuration Protocol (DHCP) and Trivial File Transfer Protocol (TFTP) servers, an IP address of the CMTS, and the like need to be set. After the foregoing setting is completed, if an intermediate line is not faulty and signal level attenuation meets a requirement, the DHCP and TFTP servers are started, and a normal communication channel can be established between a front end and the CM.

The CM is a device used on a cable television network (namely, a cable network) to access the Internet, and is connected between a cable television cable socket in a user's home and an Internet access device. Another end connected to the CM over the cable television network is at a cable television station, and the another end may be referred to as a front end or a head end.

A working mode of the CMTS 110 is CCFD. As shown in FIG. 1, the CMTS 110 may respectively send downlink signals by using channels occupying a D1 spectrum, a D2 spectrum, and a D3 spectrum, and may also receive uplink signals sent by using channels occupying a U1 spectrum, a U2 spectrum, and a U3 spectrum. The D2 spectrum overlaps the U2 spectrum, and the D3 spectrum overlaps the U3 spectrum. Therefore, a receiver of the CMTS 110 needs to perform self-interference cancellation, to cancel self-interference from a downlink transmitted signal to an uplink received signal.

The CM 120, the CM 130, the CM 140, and the CM 150 still retain uplink and downlink frequency division, namely, FDD. The CM 120, the CM 130, the CM 140, and the CM 150 need to be grouped based on a degree of isolation from each other. For example, the CM 120 and the CM 130 are in a same group, and the CM 120 and the CM 130 may send uplink signals by using channels occupying the U1 spectrum and the U3 spectrum, and may receive downlink signals sent by using channels occupying the D1 spectrum and the D2 spectrum. The U1 spectrum, the U3 spectrum, the D1 spectrum, and the D2 spectrum do not overlap each other.

The CM 140 and the CM 150 are in a same group, and the CM 140 and the CM 150 may send uplink signals by using channels occupying the U1 spectrum and the U2 spectrum, and may receive downlink signals sent by using channels occupying the D1 spectrum and the D3 spectrum. The U1 spectrum, the U2 spectrum, the D1 spectrum, and the D3 spectrum do not overlap each other.

It can be learned that spectrums of uplink and downlink channels of CMs in a same group are separated while spectrums of uplink and downlink channels of CMs in different groups may overlap.

In current DOCSIS 3.1, because each downlink orthogonal frequency division multiplexing (OFDM) symbol has a data signal, a self-interference time domain signal is random. When the CMTS performs self-interference cancellation, a blind channel estimation and adaptive filtering method is used to train an interference channel by using random data, to reconstruct an interfering signal and cancel self-interference. This self-interference cancellation method is relatively complex, and it is particularly difficult to achieve a good cancellation effect for a signal on a large bandwidth (for example, a bandwidth of 192 megahertz per downlink channel in DOCSIS 3.1).

Therefore, the present invention provides a communication method, to reduce self-interference cancellation complexity of a CMTS, and achieve a relatively good cancellation effect for a large bandwidth signal.

Figure 2:
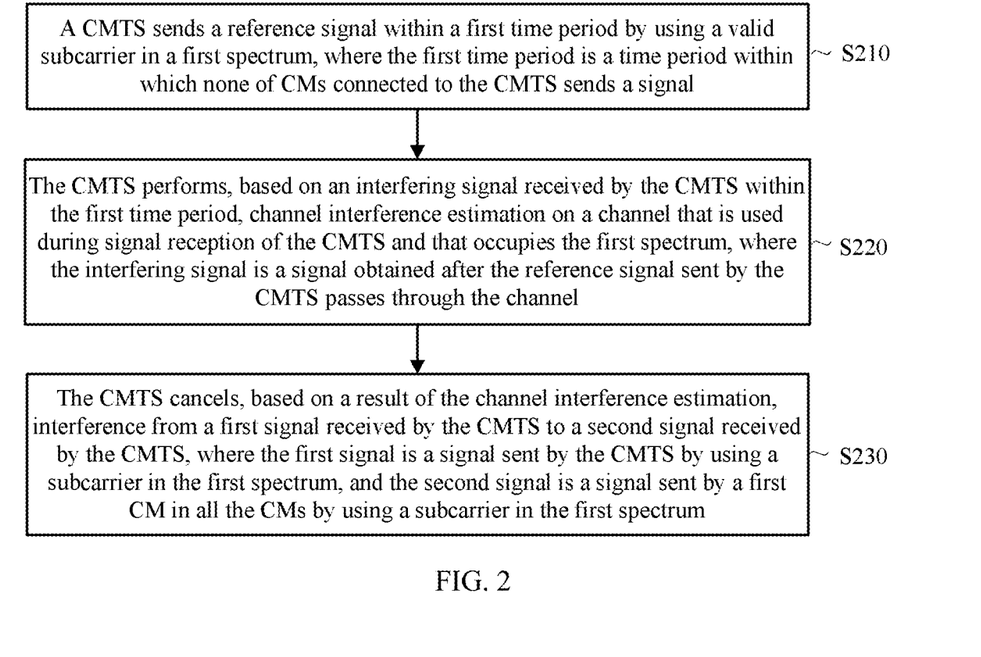
FIG. 2 is a schematic flowchart of a communication method according to an embodiment of the present invention.

FIG. 2 is a schematic flowchart of a communication method according to an embodiment of the present invention. It should be understood that FIG. 2 shows steps or operations of the communication method, but these steps or operations are merely examples, and other operations or variations of the operations in FIG. 2 may be further performed in this embodiment of the present invention. In addition, the steps in FIG. 2 may be performed in an order different from that shown in FIG. 2, and it is possible that not all operations in FIG. 2 need to be performed.

S210. A CMTS sends a reference signal within a first time period by using a valid subcarrier in a first spectrum, where the first time period is a time period within which none of CMs connected to the CMTS sends a signal in the first spectrum.

S220. The CMTS performs, based on an interfering signal received by the CMTS within the first time period, channel interference estimation on a channel that is used during signal reception of the CMTS and that occupies the first spectrum, where the interfering signal is a signal obtained after the reference signal sent by the CMTS passes through the channel.

S230. The CMTS cancels, based on a result of the channel interference estimation, interference from a first signal received by the CMTS to a second signal received by the CMTS, where the first signal is a signal sent by the CMTS by using a subcarrier in the first spectrum, and the second signal is a signal sent by a first CM in all the CMs by using a subcarrier in the first spectrum.

In this embodiment of the present invention, because none of CMs sends a signal when the CMTS sends the reference signal, the CMTS receives only the reference signal that is sent by the CMTS and that passes through a self-interference path. In addition, because the reference signal is a known reference sequence, the CMTS may relatively easily perform channel interference estimation based on the received reference signal, to obtain a channel response parameter of an self-interference path through training. Then the CMTS cancels, by using a result of the channel interference estimation, interference from a downlink signal subsequently sent by the CMTS to an uplink signal sent by a CM, thereby reducing self-interference cancellation complexity.

Correspondingly, in this embodiment of the present invention, none of the CMs connected to the CMTS sends a signal within the first time period in the first spectrum.

The reference signal may also be referred to as a probe signal, and the first time period may also be referred to as a silent timeslot or an empty probe time period. Because a silent timeslot or an empty probe symbol exists in a DOCSIS uplink, the CMTS may control, through scheduling, a time period within which a probe signal sent by the CMTS appears to be within an uplink silent timeslot or empty probe time period.

In this embodiment of the present invention, a valid subcarrier is a subcarrier that is in a channel and that can be used to carry a signal (regardless of whether the signal is a data signal or a reference signal), and the valid subcarrier is described relative to an invalid subcarrier. The invalid subcarrier, also referred to as an excluded subcarrier, is a subcarrier that cannot carry any signal, and the subcarrier may be directly set to 0 in specific implementation.

In this embodiment of the present invention, if the CMTS performs, in time domain based on the interfering signal received by the CMTS within the first time period, channel interference estimation on the channel that is used during signal reception of the CMTS and that occupies the first spectrum, "all" valid subcarriers may be used, that is, a probe signal is sent on all subcarriers in the first spectrum, or in other words, a probe signal may occupy a full spectrum of the channel, because a known time domain probe signal needs to be obtained when an interference channel is trained in time domain, where the time domain signal is obtained through inverse fast Fourier transform (IFFT) on all the subcarriers. If a subcarrier is random, a corresponding time domain signal is indeterminate.

If the CMTS performs, in frequency domain based on the interfering signal received by the CMTS within the first time period, channel interference estimation on the channel that is used during signal reception of the CMTS and that occupies the first spectrum, only "some" valid subcarriers may be used, because an interference channel is trained in frequency domain based on each subcarrier. Certainly, because channels corresponding to adjacent subcarriers are similar, a reference signal may be carried by using some valid subcarriers, and other subcarriers that carry no reference signal may be obtained by using an interpolation of a channel estimation result of the subcarriers carrying a reference signal.

The probe signal in this embodiment of the present invention may occupy the full spectrum of the channel, and all signals carried on different subcarriers in an OFDM symbol of the probe signal may be known sequences.

Figure 3:
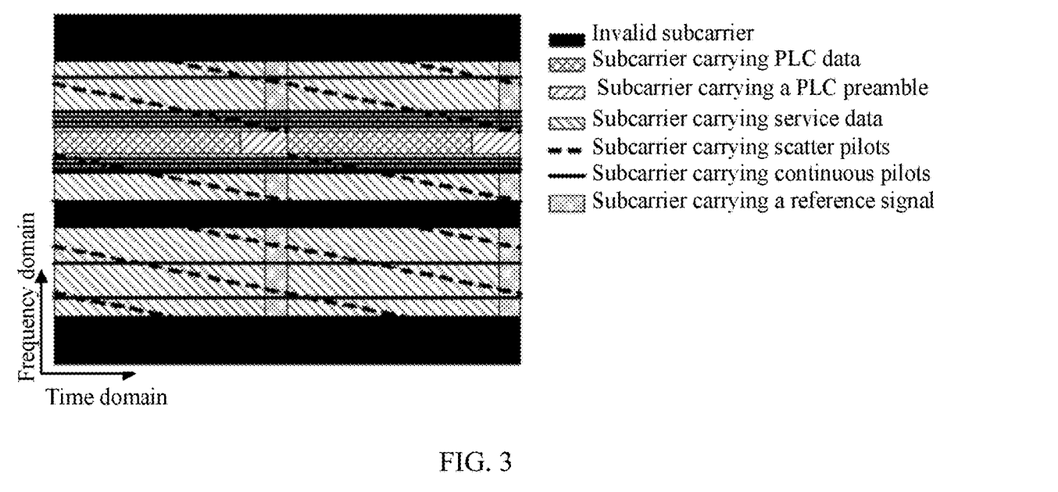
FIG. 3 is a schematic structural diagram of a frame in a communication method according to an embodiment of the present invention.

The probe signal in this embodiment of the present invention may be a signal introduced by improving a current DOCSIS 3.1 downlink frame structure. As shown in FIG. 3, in the DOCSIS 3.1 downlink frame structure, except for an invalid subcarrier (Excluded subcarrier), all valid subcarriers carry different content. A physical layer link channel (PLC) occupies continuous subcarriers, and the PLC includes a PLC preamble and PLC data. Continuous pilots occupy fixed continuous subcarriers, scatter pilots occupy interleaved subcarriers, and other subcarriers carry service data. Both the PLC data and the service data randomly vary with carried information. Both the pilot and the preamble carry fixed modulation sequences. To be specific, an improved DOCSIS 3.1 downlink frame may include an invalid subcarrier, a subcarrier used to carry PLC data, a subcarrier used to carry a PLC preamble, a subcarrier used to carry service data, a subcarrier used to carry scatter pilots, a subcarrier used to carry continuous pilots, and a subcarrier used to carry a reference signal.

The probe signal occupies one or more OFDM symbols, and in the OFDM symbols occupied by the probe signal, signals carried on different subcarriers are known sequences, which may be, for example, pseudo-randomly distributed binary phase shift keying (BPSK) sequences.

DOCSIS 3.1 has some known reference signals (for example, continuous pilot signals, scatter pilot signals, and a PLC preamble signal), and some subcarriers for the reference signals may overlap those for the newly added probe signal subcarrier. Therefore, in order not to affect a service function of DOCSIS 3.1, the overlapped subcarriers may retain original information. Because a data portion carries service information, whose content is unknown, the probe signal needs to occupy some data symbols. In order not to affect continuity of PLC data, OFDM symbols occupied by the probe signal need to overlap OFDM symbols occupied by the PLC preamble in location, so that it can be ensured that all probe signals are known reference sequences.

A DOCSIS 3.1 downlink receiver continuously demodulates downlink signals, and directly inserts a probe signal in an original frame structure. As a result, downlink demodulation in conventional DOCSIS 3.1 may be affected. If compatibility with conventional DOCSIS 3.1 needs to be considered for CCFD in this embodiment of the present invention, to enable a CM in this embodiment of the present invention to coexist with a CM in conventional DOCSIS 3.1, a probe signal needs to be generated and sent based on a DOCSIS 3.1 downlink signal processing feature.

Time domain interleaving exists in a DOCSIS 3.1 downlink. Therefore, before a CMTS or a CM sends a probe signal, the probe signal needs to be formed through time domain interleaving. Each OFDM symbol before interleaving includes an NCP and a FEC codeword. A special NCP+FEC codeword is constructed according to DOCSIS 3.1 by using features of a next codeword pointer (NCP) and a forward error correction (FEC) codeword, so that it can be ensured that the probe signal formed through interleaving does not affect service signal demodulation of the CMTS or the CM in conventional DOCSIS 3.1. According to DOCSIS 3.1, a cyclic redundancy check (CRC) corresponding to the NCP may be further generated. In other words, the symbol before interleaving may further include the CRC corresponding to the NCP.

Before interleaving, the entire OFDM symbol may be set to an unused subcarrier block, and does not carry service information. In this way, after receiving the probe signal, the CMTS or the CM may normally demodulate the probe signal. The unused subcarrier block carries a pseudo-random BPSK sequence according to a specific rule, belonging to a known sequence. Therefore, using a plurality of continuous unused subcarrier block symbols can ensure that a complete probe signal can still be formed after interleaving, and the probe signal does not include service information. Therefore, the probe signal may be used as a reference signal, to perform signal interference estimation.

Assuming that the formed probe signal needs N symbols, and that a depth of time domain interleaving is M, N+M−1 unused subcarrier block symbols are needed before interleaving. In other words, a probe signal including N symbols may be formed by performing time domain interleaving with a depth of M on N+M−1 unused subcarrier block symbols. Specifically, N+M−1 symbols are obtained after the time domain interleaving with a depth of M is performed on the N+M−1 unused subcarrier block symbols, where N symbols carry a reference sequence of the probe signal.

Figure 4:
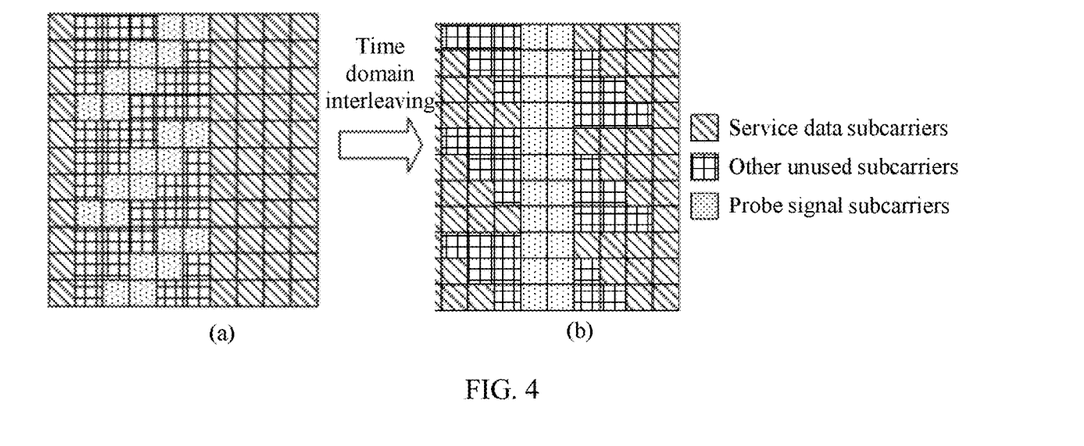
FIG. 4 is a schematic diagram of time domain interleaving in a communication method according to an embodiment of the present invention.

For example, in time-frequency resource grids shown in diagram (a) in FIG. 4, a column represents a symbol, and a row represents a subcarrier. In other words, there are 10 symbols and 11 subcarriers in diagram (a) in FIG. 4. A second symbol to a sixth symbol are probe symbols before interleaving, and subcarriers of the second symbol to the sixth symbol are all unused subcarriers. Therefore, the second symbol to the sixth symbol are unused subcarrier block symbols.

A depth of time domain interleaving is 4. Therefore, after the time domain interleaving, the symbols shown in diagram (a) in FIG. 4 may form symbols shown in diagram (b) in FIG. 4. A fifth symbol and a sixth symbol in diagram (b) in FIG. 4 form a probe signal.

In this embodiment of the present invention, the CMTS may transfer related information of a probe signal to a CM, for example, whether a probe signal appears in each PLC period (128 symbols), and when a probe signal appears, a quantity of symbols in the probe signal and locations of the symbols in the probe signal.

The related information of the probe signal may be transferred by using a DOCSIS 3.1 PLC. Because a PLC message needs time to be parsed, related information of a probe signal in a next PLC period may be sent in each PLC period. For example, one bit may be used to indicate whether a probe signal appears, three bits may be used to indicate a quantity (1 to 8) of symbols in the probe signal, and three bits may be used to indicate a start location of the symbols in the probe signal (when a plurality of symbols continuously appear). Alternatively, each symbol may correspond to one piece of three-bit location information. In this case, the symbols may discontinuously appear.

In this embodiment of the present invention, one bit reserved in the NCP may be used to indicate that the symbols are used to assemble the probe signal. C subcarriers corresponding to the symbols may carry a pseudo-random sequence by using a scrambling code.

In this embodiment of the present invention, when CCFD is implemented (for example, based on DOCSIS 3.1), if uplink and downlink signals have a relatively wide spectrum, a frequency domain self-interference cancellation algorithm is simpler and has better performance than a time domain self-interference cancellation algorithm. However, for frequency domain self-interference cancellation, it needs to be ensured that symbols of an uplink signal and an interfering signal that are received by the CMTS are synchronized. In other words, uplink and downlink signals have a same symbol period, and symbol boundaries need to be aligned in the CMTS. Therefore, a symbol boundary of the interfering signal needs to be detected in time domain by using a downlink probe signal, and a distance between the symbol boundary of the interfering signal and a symbol boundary of the uplink signal needs to be measured.

To align symbols of the interfering signal and the uplink signal, if a delay in sending the downlink signal by the CMTS is directly adjusted, a downlink service is affected (because the downlink is continuous), and therefore the symbol boundary of the uplink signal needs to be adjusted. Therefore, in this embodiment of the present invention, optionally, the CMTS may send a ranging message (to a CM, to instruct the CM to perform TA (Time Advance) adjustment. In this way, the CMTS may receive an uplink signal sent by the CM after the TA adjustment.

In this embodiment of the present invention, if different groups of CMs are isolated from each other at a sufficiently large degree, interference caused by an uplink signal of one group to a downlink received signal of another group is sufficiently small, and does not affect a service of a CM in an adjacent group. Therefore, an embodiment of the present invention further provides a communication method, to detect information about a channel between CMs, so that a CMTS can perform CM grouping, entire-network fault diagnosis, or the like based on the information (for example, information such as a degree of isolation between the CMs, micro-reflection, or a group delay) about the channel between the CMs.

In the communication method in which information about a channel between CMs is detected, the CMTS sends a reference signal within a second time period by using a valid subcarrier in a second spectrum. Within the second time period, only the CMTS sends the reference signal in the second spectrum, while none of the CMs connected to the CMTS sends a signal in the second spectrum. Then the CMTS further sends a reference signal within a third time period by using a valid subcarrier in the second spectrum. Within the third time period, except that the CMTS sends the signal, only one CM (referred to as a second CM for ease of description) in all the CMs connected to the CMTS sends a reference signal by using a valid subcarrier in the second spectrum, while none of other CMs sends a signal in the second spectrum.

On a CM side, within the first time period, none of the CMs sends any signal; within the second time period, only the second CM sends the reference signal by using the valid subcarrier in the second spectrum. Before sending the reference signal, the second CM may generate the reference signal as the CMTS generates the probe signal, and then send the reference signal. For brevity, details are not described herein again.

Correspondingly, on the CM side, a CM (referred to as a third CM for ease of description) in the CMs receives, within the second time period, only the reference signal sent by the CMTS by using the valid subcarrier in the second spectrum; then the third CM receives, within the third time period, the reference signal further sent by the CMTS by using the valid subcarrier in the second spectrum and the reference signal sent by the second CM by using the valid subcarrier in the second spectrum; and finally, the third CM may determine feature information of a channel from the second CM to the third CM based on all the signals received by the third CM within the second time period and the third time period.

The foregoing steps are only for obtaining feature information of a channel that is from one CM to another CM and that occupies the second spectrum, and each of all the CMs can obtain feature information of a channel from another CM to the CM by repeating the steps.

After the CM determines the feature information of the channel from the another CM to the CM, the CM may send the feature information of the channel to the CMTS, and then the CMTS may perform proper CM grouping based on the channel information.

Figure 5:
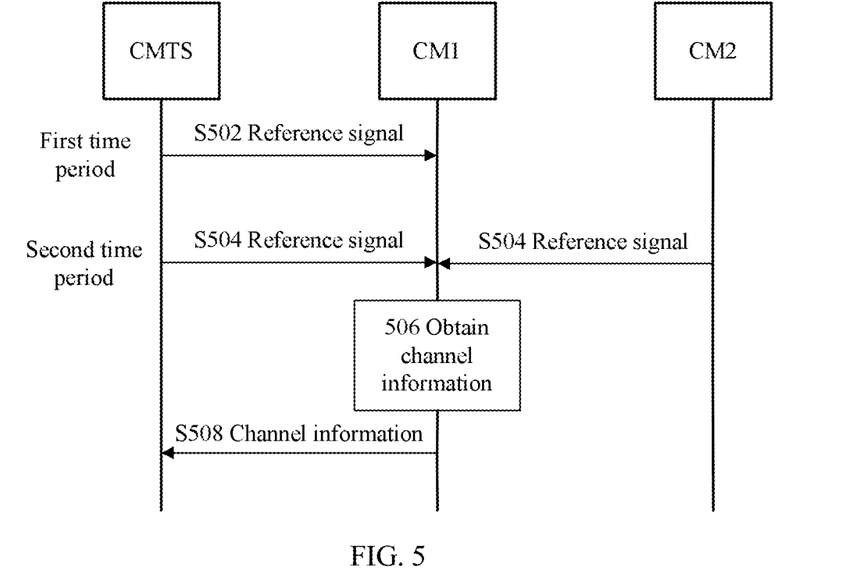
FIG. 5 is a schematic flowchart of a communication method according to an embodiment of the present invention.

The following describes, in detail with reference to FIG. 5, a communication method in which CMs detect information about a channel between the CMs in an embodiment of the present invention. It should be understood that FIG. 5 shows steps or operations of the communication method, but these steps or operations are merely examples, and other operations or variations of the operations in FIG. 5 may be further performed in this embodiment of the present invention. In addition, the steps in FIG. 5 may be performed in an order different from that shown in FIG. 5, and it is possible that not all operations in FIG. 5 need to be performed.

S502. A CMTS sends a reference signal within a first time period by using a valid subcarrier in a second spectrum. Within the first time period, none of CMs sends any signal in the second spectrum. Correspondingly, a CM1 receives, within the first time period, the reference signal sent by the CMTS by using the valid subcarrier in the second spectrum. Certainly, another CM may also receive the reference signal.

S504. Within a second time period, the CMTS further sends a reference signal by using a valid subcarrier in the second spectrum, and a CM2 also sends a reference signal by using a valid subcarrier in the second spectrum. Correspondingly, the CM1 receives the signals in the second spectrum within the second time period. Certainly, another CM may also receive these reference signals.

Within the second time period, the CM1 can receive the reference signal sent by the CMTS by using the valid subcarrier in the second spectrum, and can also receive the reference signal sent by the CM2 by using the valid subcarrier in the second spectrum.

S506. The CM1 deducts the signal received within the first time period from the signals received within the second time period, to obtain the reference signal sent by the CM2 within the second time period by using the valid subcarrier in the second spectrum. Then the CM1 may obtain, based on the reference signal sent by the CM2 within the second time period by using the valid subcarrier in the second spectrum, feature information of a channel (which may be briefly referred to as information about the channel) that is from the CM2 to the CM1 and that occupies the second spectrum.

S508. The CM1 sends, to the CMTS, the obtained feature information of the channel that is from the CM2 to the CM1 and that occupies the second spectrum. Correspondingly, the CMTS receives the feature information of the channel that is from the CM2 to the CM1 and that occupies the second spectrum.

The CMTS may obtain, by repeating the foregoing steps, feature information of a channel that is from each of a plurality of CMs connected to the CMTS to another CM and that occupies a spectrum. In this way, the CMTS may perform an operation such as grouping the CMs or entire-network fault diagnosis based on feature information of channels between the CMs.

The following describes the CMTS and the CM in the communication method in the embodiments of the present invention with reference to FIG. 6 to FIG. 11.

Figure 6:
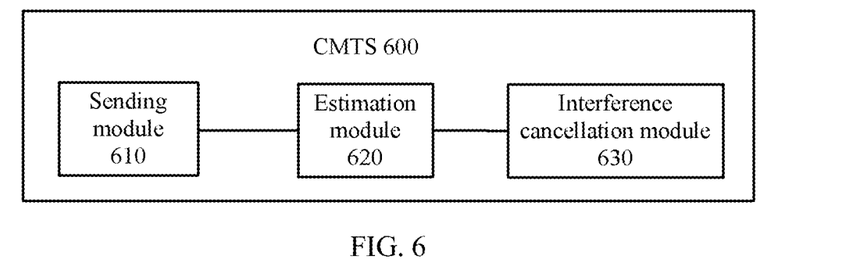
FIG. 6 is a schematic structural diagram of a CMTS according to an embodiment of the present invention.

FIG. 6 is a schematic structural diagram of a CMTS 600 according to an embodiment of the present invention. It should be understood that the CMTS shown in FIG. 6 is only an example, and the CMTS in this embodiment of the present invention may further include another module or unit, or include modules whose functions are similar to those of modules in FIG. 6, or not include all modules in FIG. 6.

A sending module 610 is configured to send a reference signal within a first time period by using a valid subcarrier in a first spectrum, where the first time period is a time period within which none of cable modems CMs connected to the CMTS sends a signal in the first spectrum.

An estimation module 620 is configured to perform, based on an interfering signal received by the CMTS within the first time period, channel interference estimation on a channel that is used during signal reception of the CMTS and that occupies the first spectrum, where the interfering signal is a signal obtained after the reference signal sent by the CMTS passes through the channel.

An interference cancellation module 630 is configured to cancel, based on a result of the channel interference estimation, interference from a first signal received by the CMTS to a second signal received by the CMTS, where the first signal is a signal sent by the CMTS by using a subcarrier in the first spectrum, and the second signal is a signal sent by a first CM in all the CMs by using a subcarrier in the first spectrum.

In this embodiment of the present invention, because none of CMs sends a signal in the first spectrum when the CMTS sends the reference signal in the first spectrum, the CMTS receives only the reference signal that is sent by the CMTS and that passes through a self-interference path. In addition, because the reference signal is a known reference sequence, the CMTS may relatively easily perform, based on the received reference signal, channel interference estimation on the channel corresponding to the first spectrum, to obtain a channel response parameter of the self-interference path through training. Then the CMTS cancels, by using a result of the channel interference estimation, interference from a downlink signal subsequently sent by the CMTS to an uplink signal sent by a CM, thereby reducing self-interference cancellation complexity.

Optionally, in an embodiment, the CMTS further includes an interleaving module and a generation module. The interleaving module is configured to perform time domain interleaving with a depth of M on N continuous unused subcarrier block symbols, where each of the N continuous unused subcarrier block symbols includes an NCP and a FEC codeword, M and N are integers greater than 0, and N>M−1. The generation module is configured to generate the reference signal, where a reference sequence corresponding to the reference signal is carried in N+1−M interleaved symbols.

Optionally, in an embodiment, the sending module is further configured to send a ranging message to the first CM, to instruct the first CM to perform time advance TA adjustment, so that the first CM sends the second signal after performing the TA adjustment.

Optionally, in an embodiment, the sending module is further configured to: send a reference signal within a second time period by using a valid subcarrier in a second spectrum, where the second time period is a time period within which none of the CMs sends a signal in the second spectrum; and send a reference signal within a third time period by using a valid subcarrier in the second spectrum, where the third time period is a time period within which a second CM in all the CMs sends a reference signal by using a valid subcarrier in the second spectrum while none of other CMs sends a signal in the second spectrum, so that a third CM in the other CMs determines, based on the reference signals received by the third CM within the second time period and the third time period, information about a channel that is from the second CM to the third CM and that occupies the second spectrum.

Optionally, in an embodiment, the CMTS further includes a receiving module, configured to receive the information about the channel sent by the third CM.

Optionally, in an embodiment, the sending module is further configured to: send indication information used to indicate that the CMTS is to send a reference signal, information about a quantity of subcarrier block symbols included in the to-be-sent reference signal, and information about locations of the subcarrier block symbols included in the to-be-sent reference signal.

The CMTS 600 may perform each step that is in the communication method shown in FIG. 2 or FIG. 5 and that is performed by a CMTS. For brevity, details are not described herein again.

Figure 7:
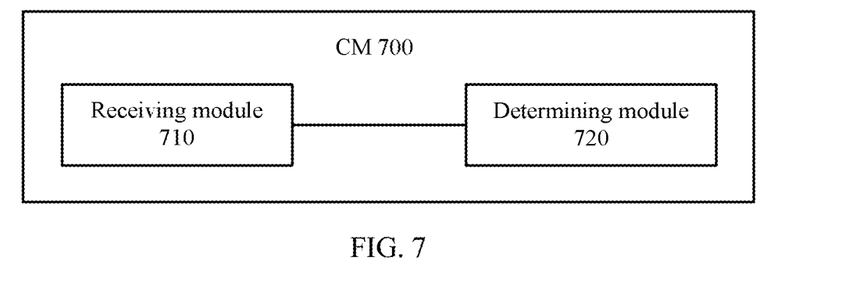
FIG. 7 is a schematic structural diagram of a CM according to an embodiment of the present invention.

FIG. 7 is a schematic structural diagram of a CM 700 according to an embodiment of the present invention. It should be understood that the CM shown in FIG. 7 is only an example, and the CM in this embodiment of the present invention may further include another module or unit, or include modules whose functions are similar to those of modules in FIG. 7, or not include all modules in FIG. 7.

A receiving module 710 is configured to receive, within a first time period, a reference signal sent by a cable modem terminal system CMTS by using a valid subcarrier in a first spectrum, where the first time period is a time period within which none of CMs connected to the CMTS sends a signal in the first spectrum, and all the CMs include the CM.

The receiving module 710 is further configured to receive, within a second time period, a reference signal sent by a second CM by using a valid subcarrier in the first spectrum and a reference signal sent by the CMTS by using a valid subcarrier in the first spectrum, where the second CM is a CM in all the CMs, and the second time period is a time period within which none of other CMs, different from the second CM, in all the CMs sends a signal in the first spectrum.

A determining module 720 is configured to determine, based on the reference signals received within the first time period and the second time period, information about a channel that is from the second CM to the first CM and that occupies the first spectrum.

The CM in this embodiment of the present invention may measure information about a channel that is from another CM to the CM and that corresponds to a spectrum, so that an operation such as CM grouping or fault diagnosis can be performed based on the channel information.

Optionally, in an embodiment, the CM further includes a sending module, configured to send the information about the channel to the CMTS.

The CM 700 may perform a step that is in the communication method shown in FIG. 2 and that is performed by the third CM, or a step that is in the communication method shown in FIG. 5 and that is performed by the CM1. For brevity, details are not described herein again.

Figure 8:
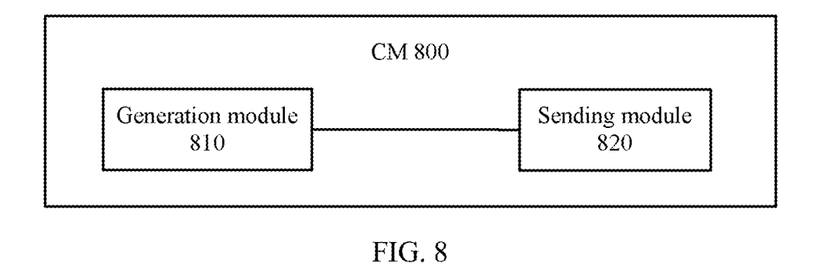
FIG. 8 is a schematic structural diagram of a CM according to an embodiment of the present invention.

FIG. 8 is a schematic structural diagram of a CM 800 according to an embodiment of the present invention. It should be understood that the CM shown in FIG. 8 is only an example, and the CM in this embodiment of the present invention may further include another module or unit, or include modules whose functions are similar to those of modules in FIG. 8, or not include all modules in FIG. 8.

A generation module 810 is configured to generate a first reference signal.

A sending module 820 is configured to send the first reference signal within a first time period by using a valid subcarrier in a first spectrum, where the first time period is a time period within which a cable modem terminal system CMTS connected to the first CM sends a reference signal by using a valid subcarrier in the first spectrum while none of other CMs, different from the first CM, in all CMs connected to the CMTS sends a signal in the first spectrum.

The CM in this embodiment of the present invention may measure information about a channel that is from another CM to the CM and that corresponds to a spectrum, so that an operation such as CM grouping or fault diagnosis can be performed based on the channel information.

Optionally, in an embodiment, the generation module is specifically configured to: perform time domain interleaving with a depth of M on N continuous unused subcarrier block symbols, where each of the N continuous unused subcarrier block symbols includes an NCP and a FEC codeword, M and N are integers greater than 0, and N>M−1; and generate the first reference signal, where a reference sequence corresponding to the first reference signal is carried in N+1−M interleaved symbols.

The CM 800 may perform a step that is in the communication method shown in FIG. 2 and that is performed by the second CM, or a step that is in the communication method shown in FIG. 5 and that is performed by the CM2. For brevity, details are not described herein again.

The CM 700 shown in FIG. 7 may further include the modules included in the CM 800 shown in FIG. 8, and the CM 800 shown in FIG. 8 may further include the modules included in the CM 700 shown in FIG. 7. For brevity, details are not described herein again.

Figure 9:
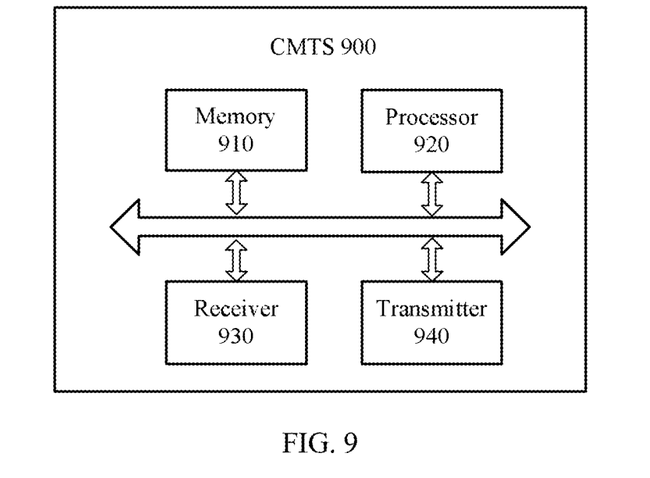
FIG. 9 is a schematic structural diagram of a CMTS according to an embodiment of the present invention.

FIG. 9 is a schematic structural diagram of a CMTS 900 according to an embodiment of the present invention. The CMTS 900 includes a memory 910, a processor 920, a receiver 930, and a transmitter 940.

The memory 910 is configured to store a program.

The processor 920 is configured to execute the program stored in the memory 910.

When the processor 920 executes the program stored in the memory 910, the transmitter 940 is configured to send a reference signal within a first time period by using a valid subcarrier in a first spectrum, where the first time period is a time period within which none of cable modems CMs connected to the CMTS sends a signal in the first spectrum.

The processor 920 is further configured to perform, based on an interfering signal received by the CMTS within the first time period, channel interference estimation on a channel that is used during signal reception of the CMTS and that occupies the first spectrum, where the interfering signal is a signal obtained after the reference signal sent by the CMTS passes through the channel.

The processor 920 is further configured to cancel, based on a result of the channel interference estimation, interference from a first signal received by the CMTS to a second signal received by the CMTS, where the first signal is a signal sent by the CMTS by using a subcarrier in the first spectrum, and the second signal is a signal sent by a first CM in all the CMs by using a subcarrier in the first spectrum.

In this embodiment of the present invention, because none of CMs sends a signal in the first spectrum when the CMTS sends the reference signal in the first spectrum, the CMTS receives only the reference signal that is sent by the CMTS and that passes through a self-interference path. In addition, because the reference signal is a known reference sequence, the CMTS may relatively easily perform, based on the received reference signal, channel interference estimation on the channel corresponding to the first spectrum, to obtain a channel response parameter of the self-interference path through training. Then the CMTS cancels, by using a result of the channel interference estimation, interference from a downlink signal subsequently sent by the CMTS to an uplink signal sent by a CM, thereby reducing self-interference cancellation complexity.

Optionally, in an embodiment, the processor 920 is further configured to: perform time domain interleaving with a depth of M on N continuous unused subcarrier block symbols, where each of the N continuous unused subcarrier block symbols includes an NCP and a FEC codeword, M and N are integers greater than 0, and N>M−1; and generate the reference signal, where a reference sequence corresponding to the reference signal is carried in N+1−M interleaved symbols.

Optionally, in an embodiment, the transmitter 940 is further configured to send a ranging message to the first CM, to instruct the first CM to perform time advance TA adjustment, so that the first CM sends the second signal after performing the TA adjustment.

Optionally, in an embodiment, the transmitter 940 is further configured to: send a reference signal within a second time period by using a valid subcarrier in a second spectrum, where the second time period is a time period within which none of the CMs sends a signal in the second spectrum; and send a reference signal within a third time period by using a valid subcarrier in the second spectrum, where the third time period is a time period within which a second CM in all the CMs sends a reference signal by using a valid subcarrier in the second spectrum while none of other CMs sends a signal in the second spectrum, so that a third CM in the other CMs determines, based on the reference signals received by the third CM within the second time period and the third time period, information about a channel that is from the second CM to the third CM and that occupies the second spectrum.

Optionally, in an embodiment, the receiver 930 is configured to receive the information about the channel sent by the third CM.

Optionally, in an embodiment, the transmitter 940 is further configured to: send indication information used to indicate that the CMTS is to send a reference signal, information about a quantity of subcarrier block symbols included in the to-be-sent reference signal, and information about locations of the subcarrier block symbols included in the to-be-sent reference signal.

The CMTS 900 may perform each step that is in the communication method shown in FIG. 2 or FIG. 5 and that is performed by a CMTS. For brevity, details are not described herein again.

Figure 10:
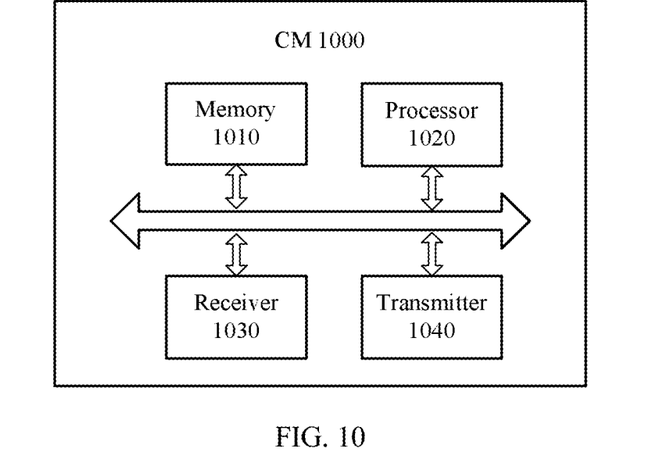
FIG. 10 is a schematic structural diagram of a CM according to an embodiment of the present invention.

FIG. 10 is a schematic structural diagram of a CM 1000 according to an embodiment of the present invention. The CM 1000 includes a memory 1010, a processor 1020, a receiver 1030, and a transmitter 1040.

The memory 1010 is configured to store a program.

The processor 1020 is configured to execute the program stored in the memory 1010.

When the processor 1020 executes the program stored in the memory 1010, the receiver 1030 is configured to receive, within a first time period, a reference signal sent by a CMTS by using a valid subcarrier in a first spectrum, where the first time period is a time period within which none of CMs connected to the CMTS sends a signal in the first spectrum, and all the CMs include the CM.

The receiver 1030 is further configured to receive, within a second time period, a reference signal sent by a second CM by using a valid subcarrier in the first spectrum and a reference signal sent by the CMTS by using a valid subcarrier in the first spectrum, where the second CM is a CM in all the CMs, and the second time period is a time period within which none of other CMs, different from the second CM, in all the CMs sends a signal in the first spectrum.

The processor 1020 is configured to determine, based on the reference signals received within the first time period and the second time period, information about a channel that is from the second CM to the first CM and that occupies the first spectrum.

The CM in this embodiment of the present invention may measure information about a channel that is from another CM to the CM and that corresponds to a spectrum, so that an operation such as CM grouping or fault diagnosis can be performed based on the channel information.

Optionally, in an embodiment, the transmitter 1040 is configured to send the information about the channel to the CMTS.

The CM 1000 may perform each step that is in the communication method shown in FIG. 2 and that is performed by the third CM, or each step that is in the communication method shown in FIG. 5 and that is performed by the CM1. For brevity, details are not described herein again.

Figure 11:
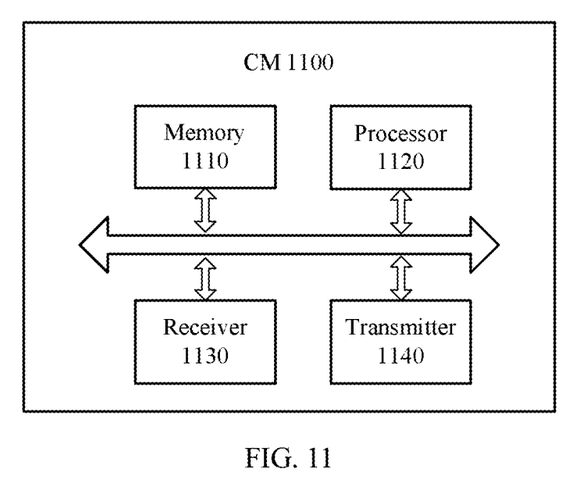
FIG. 11 is a schematic structural diagram of a CM according to an embodiment of the present invention.

FIG. 11 is a schematic structural diagram of a CM 1100 according to an embodiment of the present invention. The CM 1100 includes a memory 1110, a processor 1120, a receiver 1130, and a transmitter 1140.

The memory 1110 is configured to store a program.

The processor 1120 is configured to execute the program stored in the memory 1110.

When the processor 1120 executes the program stored in the memory 1110, the processor 1120 is specifically configured to generate a first reference signal.

The transmitter 1140 is configured to send the first reference signal within a first time period by using a valid subcarrier in a first spectrum, where the first time period is a time period within which a cable modem terminal system CMTS connected to the first CM sends a reference signal by using a valid subcarrier in the first spectrum while none of other CMs, different from the first CM, in all CMs connected to the CMTS sends a signal in the first spectrum.

The CM in this embodiment of the present invention may measure information about a channel that is from another CM to the CM and that corresponds to a spectrum, so that an operation such as CM grouping or fault diagnosis can be performed based on the channel information.

Optionally, in an embodiment, the processor 1120 is specifically configured to: perform time domain interleaving with a depth of M on N continuous unused subcarrier block symbols, where each of the N continuous unused subcarrier block symbols includes an NCP and a FEC codeword, M and N are integers greater than 0, and N>M−1; and generate the first reference signal, where a reference sequence corresponding to the first reference signal is carried in N+1−M interleaved symbols.

The CM 1100 may perform each step that is in the communication method shown in FIG. 2 and that is performed by the second CM, or each step that is in the communication method shown in FIG. 5 and that is performed by the CM2. For brevity, details are not described herein again.

The memory, the processor, the receiver, and the transmitter in the CM 1100 shown in FIG. 11 may be further configured to implement functions of the memory, the processor, the receiver, and the transmitter in the CM 1000 shown in FIG. 10. The memory, the processor, the receiver, and the transmitter in the CM 1000 shown in FIG. 10 may also be further configured to implement functions of the memory, the processor, the receiver, and the transmitter in the CM 1100 shown in FIG. 11. For brevity, details are not described herein again.

Figure 12:
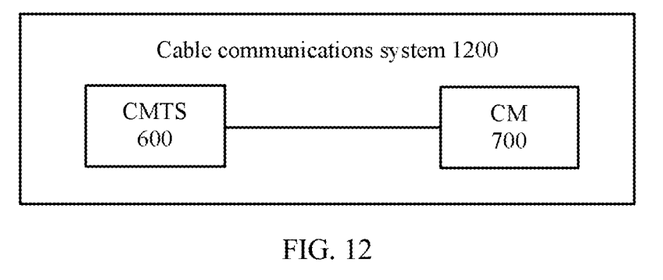
FIG. 12 is a schematic structural diagram of a cable communications system according to an embodiment of the present invention.

FIG. 12 is a schematic structural diagram of a cable communications system 1200 according to an embodiment of the present invention. It should be understood that the cable communications system shown in FIG. 12 is only an example, and the cable communications system in this embodiment of the present invention may further include another device or apparatus, or include devices whose functions are similar to those of devices in FIG. 12, or not include both devices in FIG. 12.

The cable communications system 1200 includes the CMTS 600 shown in FIG. 6 and the CM 700 shown in FIG. 7. For brevity, the CMTS 600 and the CM 700 are not described herein in detail again.

It may be understood that the processor in the embodiments of the present invention may be an integrated circuit chip, having a signal processing capability. In an implementation process, steps in the foregoing method embodiments can be implemented by using a hardware-integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these and any memory of another proper type.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The storage medium includes: various media that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
   sending, by a cable modem terminal system (CMTS), a reference signal within a first time period by using a valid subcarrier in a first spectrum, wherein the first time period is a time period within which none of cable modems (CMs) connected to the CMTS sends a signal in the first spectrum;
   performing, by the CMTS and based on an interfering signal received by the CMTS within the first time period, channel interference estimation on a channel that is used during signal reception of the CMTS and that occupies the first spectrum, wherein the interfering signal is a signal obtained after the reference signal sent by the CMTS passes through the channel; and
   canceling, by the CMTS based on a result of the channel interference estimation, interference from a first signal of the CMTS to a second signal received by the CMTS, wherein the first signal is a signal sent by the CMTS by using a subcarrier in the first spectrum, and the second signal is a signal sent by a first CM in the CMs by using a subcarrier in the first spectrum.

2. The communication method according to claim 1, wherein the communication method further comprises:
   performing, by the CMTS, time domain interleaving with a depth of M on N continuous unused subcarrier block symbols, wherein each of the N continuous unused subcarrier block symbols comprises a next codeword pointer (NCP) and a forward error correction (FEC) codeword, M and N are integers greater than 0, and N>M−1; and
   generating, by the CMTS, the reference signal, wherein a reference sequence corresponding to the reference signal is carried in N+1−M interleaved symbols.

3. The communication method according to claim 1, wherein the communication method further comprises:
   sending, by the CMTS, a ranging message to the first CM, wherein the ranging message instructs the first CM to perform time advance (TA) adjustment and sends the second signal after performing the TA adjustment.

4. The communication method according to claim 1, wherein the communication method further comprises:
   sending, by the CMTS, a reference signal within a second time period by using a valid subcarrier in a second spectrum, wherein the second time period is a time period within which none of the CMs sends a signal in the second spectrum; and
   sending, by the CMTS, a reference signal within a third time period by using a valid subcarrier in the second spectrum, wherein the third time period is a time period within which a second CM in the CMs sends a reference signal by using a valid subcarrier in the second spectrum while none of other CMs sends a signal in the second spectrum, and a third CM in the other CMs determines, based on the reference signal received by the third CM within the second time period and the third time period, information about a channel that is from the second CM to the third CM and that occupies the second spectrum.

5. The communication method according to claim 4, wherein the communication method further comprises:
   receiving, by the CMTS, the information about the channel sent by the third CM.

6. The communication method according to claim 1, wherein the communication method further comprises:

sending, by the CMTS, indication information indicating that the CMTS is to send a reference signal, information about a quantity of subcarrier block symbols comprised in the reference signal, and information about locations of the subcarrier block symbols comprised in the to-be-sent reference signal.

7. A communication method, comprising:

receiving, by a first cable modem (CM) within a first time period, a reference signal sent by a cable modem terminal system (CMTS) by using a valid subcarrier in a first spectrum, wherein the first time period is a time period within which none of CMs connected to the CMTS sends a signal in the first spectrum, and the first CM is a CM in the CMs;

receiving, by the first CM within a second time period, a reference signal sent by a second CM by using a valid subcarrier in the first spectrum and a reference signal sent by the CMTS by using a valid subcarrier in the first spectrum, wherein the second CM is a CM in the CMs, and the second time period is a time period within which none of other CMs, different from the second CM, in the CMs sends a signal in the first spectrum; and determining, by the first CM based on the reference signal received within the first time period and the second time period, information about a channel that is from the second CM to the first CM and that occupies the first spectrum.

8. The communication method according to claim 7, wherein the communication method further comprises:

sending, by the first CM, the information about the channel to the CMTS.

9. A cable modem terminal system (CMTS), comprising:

a processor;
a transmitter; and
a computer readable storage medium storing a plurality of processor-executable instructions that, when executed by the processor, cause the processor and the transmitter to perform operations comprising:

sending a reference signal within a first time period by using a valid subcarrier in a first spectrum, wherein the first time period is a time period within which none of cable modems (CMs) connected to the CMTS sends a signal in the first spectrum;

performing, based on an interfering signal received by the CMTS within the first time period, channel interference estimation on a channel that is used during signal reception of the CMTS and that occupies the first spectrum, wherein the interfering signal is a signal obtained after the reference signal sent by the CMTS passes through the channel; and canceling, based on a result of the channel interference estimation, interference from a first signal of the CMTS to a second signal received by the CMTS, wherein the first signal is a signal sent by the CMTS by using a subcarrier in the first spectrum, and the second signal is a signal sent by a first CM in the CMs by using a subcarrier in the first spectrum.

10. The CMTS according to claim 9, wherein the operations further comprising:

performing time domain interleaving with a depth of M on N continuous unused subcarrier block symbols, wherein each of the N continuous unused subcarrier block symbols comprises a next codeword pointer (NCP) and a forward error correction (FEC) codeword, M and N are integers greater than 0, and N>M−1; and generating the reference signal, wherein a reference sequence corresponding to the reference signal is carried in N+1−M symbols.

11. The CMTS according to claim 9, wherein the operations further comprising:

sending a ranging message to the first CM, wherein the ranging message instructs the first CM to perform time advance TA adjustment and sends the second signal after performing the TA adjustment.

12. The CMTS according to claim 9, wherein the operations further comprising:

sending a reference signal within a second time period by using a valid subcarrier in a second spectrum, wherein the second time period is a time period within which none of the CMs sends a signal in the second spectrum; and sending a reference signal within a third time period by using a valid subcarrier in the second spectrum, wherein the third time period is a time period within which a second CM in the CMs sends a reference signal by using a valid subcarrier in the second spectrum while none of other CMs sends a signal in the second spectrum, and a third CM in the other CMs determines, based on the reference signal received by the third CM within the second time period and the third time period, information about a channel that is from the second CM to the third CM and that occupies the second spectrum.

13. The CMTS according to claim 12, wherein the CMTS further comprises a receiver, configured to receive the information about the channel sent by the third CM.

14. The CMTS according to claim 9, wherein the operations further comprising:

sending indication information indicating that the CMTS is to send a reference signal, information about a quantity of subcarrier block symbols comprised in the reference signal, and information about locations of the subcarrier block symbols comprised in the to-be-sent reference signal.

15. A first cable modem (CM), comprising:

a processor;
a receiver; and
a computer readable storage medium storing a plurality of processor-executable instructions that, when executed by the processor, cause the processor and the receiver to perform operations comprising:

receiving, within a first time period, a reference signal sent by a cable modem terminal system (CMTS) by using a valid subcarrier in a first spectrum, wherein the first time period is a time period within which none of CMs connected to the CMTS sends a signal in the first spectrum, and the CMs connected to the CMTS comprise the first CM, receiving, within a second time period, a reference signal sent by a second CM by using a valid subcarrier in the first spectrum and a reference signal sent by the CMTS by using a valid subcarrier in the first spectrum, wherein the second CM is a CM in the CMs, and the second time period is a time period within which none of other CMs, different from the second CM, in the CMs sends a signal in the first spectrum; and determining, based on the reference signal received within the first time period and the second time period, information about a channel that is from the second CM to the first CM and that occupies the first spectrum.

16. The first CM according to claim 15, wherein the first CM further comprises a transmitter, configured to send the information about the channel to the CMTS.

\* \* \* \* \*

UNITED STATES PATENT AND TRADEMARK OFFICE
CERTIFICATE OF CORRECTION

PATENT NO. : 10,938,509 B2
APPLICATION NO. : 16/229769
DATED : March 2, 2021
INVENTOR(S) : Tao Ouyang et al.

Page 1 of 1

It is certified that error appears in the above-identified patent and that said Letters Patent is hereby corrected as shown below:

On the Title Page

In Column 2, Line 2, item (57), in the Abstract, delete "stem)," and insert -- system), --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*